UNITED STATES PATENT OFFICE.

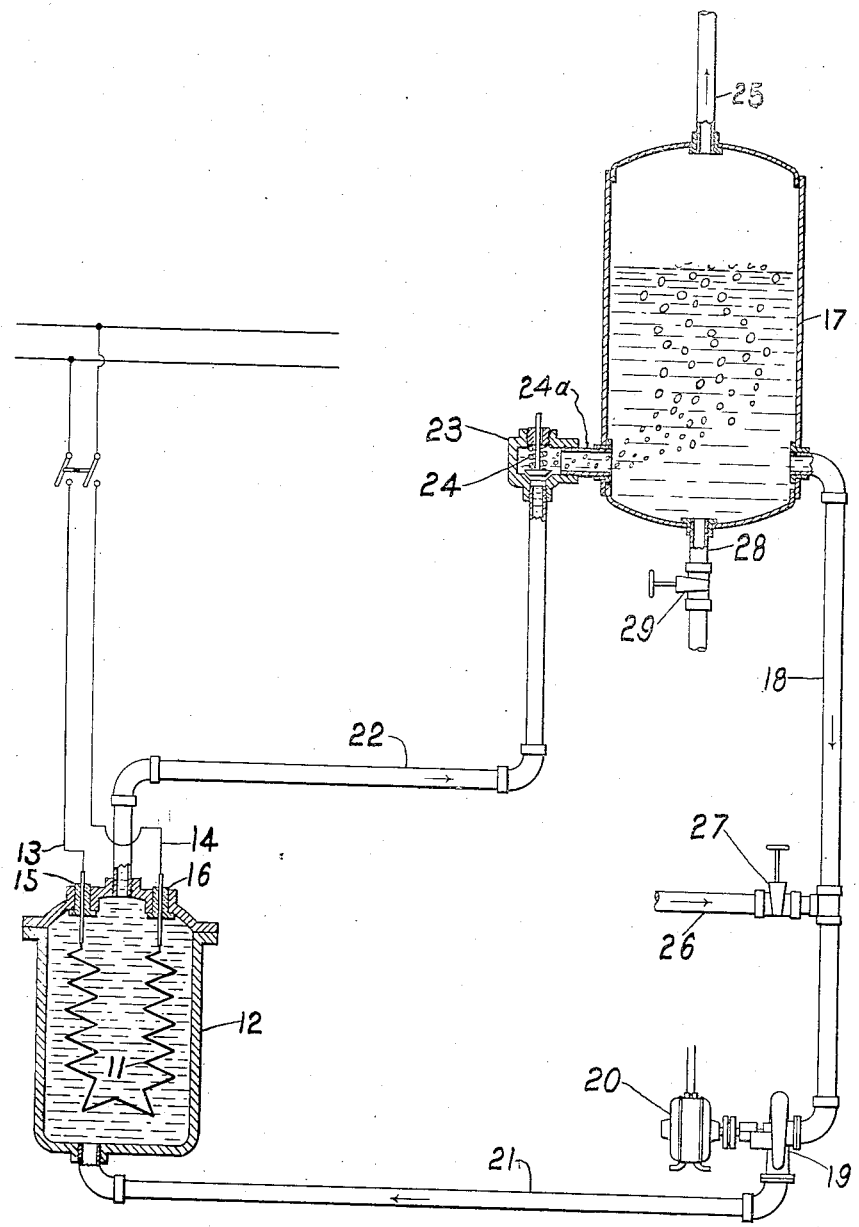

WILLIAM MONROE WHITE, OF MILWAUKEE, WISCONSIN.

ELECTRICAL BOILER.

1,399,175.  Specification of Letters Patent.  Patented Dec. 6, 1921.

Application filed December 23, 1919. Serial No. 346,885.

*To all whom it may concern:*

Be it known that I, WILLIAM MONROE WHITE, a citizen of the United States, residing at Milwaukee, in the county of Milwaukee and State of Wisconsin, have invented certain new and useful Improvements in Electrical Boilers, of which the following is a specification.

The invention relates to electrical steam boilers.

The invention designs to provide an effective means for generating steam by means of an electric current.

The invention designs to provide means for preventing vaporization at, in or about the heating element.

An object of the invention is to provide means for maintaining a pressure in the water surrounding the heating element at a pressure in excess of the pressure of the steam, thereby preventing vaporization at the heating element.

An object of the invention is to provide means for circulating the water and means for causing vaporization to take place in a chamber separate from the chamber containing the heating element.

An object of the invention is to provide means for preventing the deposition of foreign matter on the heating element.

The invention consists of the several features hereinafter set forth and more particularly defined by claims at the conclusion thereof.

The drawing shows one form of my electric steam boiler with the heating element and steam chamber shown in cross section.

Before entering into a description of the invention I shall describe and explain the defects of some of the present means of generating steam by an electric current and means proposed for overcoming such defects.

In heating elements, heretofore used, it has been found that, when the heating element has raised the temperature of the water to the boiling point, vaporization takes place on the surface of the heating element. The bubbles of steam formed at the surface of the heating element then insulate the water from the surface of the heating element, decreasing the effectiveness of the heating device. Furthermore, when vaporization occurs, only pure water passes into the vaporized state leaving the carbonates and other impurities as a deposit on the heating element, which are baked by the high temperature of the heating element, and which cake in such quantity as to render the heating element ineffective. When the bubbles of steam are permitted to form on the heating element, certain chemical action takes place which causes decomposition and the ultimate destruction of the heating element.

My invention provides a means for overcoming these defects by maintaining water in contact with the heating element at a pressure in excess of that corresponding to the pressure for vaporization of the liquid at the temperature maintained in the water in contact with the heating element. Stating the matter in terms of heat: My invention provides a means for overcoming the defects mentioned above by circulating water in contact with the heating element at a temperature less than the temperature at which vaporization would occur at the excess pressure maintained.

My invention will be more readily understood by reference to the accompanying drawing wherein a resistance 11 is provided through which an electric current is caused to pass resulting in the heating of the element. A container 12 is provided within which the heating element is disposed. Wires 13, 14 connect the heating element to a source of electrical energy. Bushings 15, 16 insulate the wires from the heating container 12. A steam container 17 is provided wherein the steam is caused to separate from the water. A pipe 18 connects the steam container to the suction of a pump 19, driven by power as indicated by a motor 20. A pipe 21 connects the discharge of the pump to the lower portion of the heating container 12. A pipe 22 connects the upper portion of the heating container 12 to the steam container 17; within this pipe is disposed a regulating valve 23 controlled by a spring 24. A chamber 24ª is provided connecting the regulating valve and the steam container within which vaporization may take place. A steam pipe 25 leads from the steam container to any steam absorbing device. The water of vaporization is supplied through a pipe 26 and is controlled by a valve 27. The pump 19 draws water from the steam container, forcing it to circulate through the heating container and back to the steam container against the pressure maintained by the regulating valve. Such pressure is maintained in the heating container by the adjustment of the opposing spring 24 of the regulating valve, and such quantity of water is caused to flow by the pump that vaporization does not take place within the heating container 12, for the reason that the temperature within the heating chamber is below the boiling point at that pressure.

When vaporization takes place beyond the regulating valve 23, and within the steam container 17, the carbonates or other impurities in the water are deposited and collect in the bottom of the steam container 17 and may be blown off through a drain pipe 28, controlled by a valve 29.

It will thus be seen that an essential part of my invention is maintaining about the heating element a pressure in the water sufficiently great to prevent steam forming at the heating element, and providing a circulation of water in contact with the heating element to maintain the temperature below that corresponding to the vaporization point at the pressure maintained within the heating chamber.

It should be clearly understood that the method of accomplishing the beneficient effects of my invention are illustrated here diagrammatically and in one form only. Another means for accomplishing this result would be the locating of the heating container materially below the elevation of the steam container, connecting the two by a piping system permitting circulation between them. In such a device the regulating valve and the pump would be essential.

Manifestly the heating element may consist of electrodes emersed within the heating chamber and the water heated by causing a current to flow from one electrode to the other. Manifestly the regulating valve may be replaced by an orifice or orifices such as will restrict the flow and maintain a back pressure during flow.

The invention is not to be restricted to the use of the particular form of device as described above but may be varied so as to come within the scope of the appended claims.

I claim:

1. In an electrical boiler, the combination of a container within which the water is heated by electric current, a container within which steam is maintained, and means for forcibly circulating water between them, for the purpose and substantially as described.

2. In an electrical boiler, the combination of a container within which the water is heated by electric current, a container within which steam is maintained, means for forcibly circulating water between them, and means for maintaining a greater pressure in the heating container than in the steam container, for the purpose and substantially as described.

3. In a device for generating steam by electric current, means for forcibly circulating water under excess pressure in contact with the heating element, substantially as described.

4. In a device for the generation of steam by an electric current, means for forcibly circulating water, in contact with the heating element, under a pressure in excess of the steam pressure maintained, substantially as described.

5. In an electrical boiler of the class described, means for maintaining a pressure in the liquid about the heating element, materially in excess of the pressure of the steam, and means for forcibly producing a flow of water to and from the heating element, substantially as described.

6. In a device for generating steam by an electric current, means for forcibly maintaining the temperature of the liquid, in contact with the heating element, below the boiling point at the pressure maintained.

7. In a device for generating steam by an electric current means for maintaining the temperature of the liquid, forcibly maintained in contact with the heating element, below the boiling point at the pressure maintained.

WILLIAM MONROE WHITE.